United States Patent
Patron

(10) Patent No.: US 12,319,879 B2
(45) Date of Patent: Jun. 3, 2025

(54) HYDROTREATMENT UPFLOW REACTORS WITH HIGH HYDROGEN-HYDROCARBON LIQUID CONTACT SURFACE AND IMPROVED HYDROGENATION CAPACITY

(71) Applicant: Luigi Patron, Milan (IT)

(72) Inventor: Luigi Patron, Milan (IT)

( * ) Notice: Subject to any disclaimer, the term of this patent is extended or adjusted under 35 U.S.C. 154(b) by 297 days.

(21) Appl. No.: 17/789,908

(22) PCT Filed: Apr. 21, 2021

(86) PCT No.: PCT/IT2021/050122
§ 371 (c)(1),
(2) Date: Jun. 29, 2022

(87) PCT Pub. No.: WO2021/224949
PCT Pub. Date: Nov. 11, 2021

(65) Prior Publication Data
US 2023/0051646 A1    Feb. 16, 2023

(30) Foreign Application Priority Data

May 5, 2020   (IT) .................. 102020000009880

(51) Int. Cl.
| | |
|---|---|
| *C10G 49/12* | (2006.01) |
| *B01D 3/10* | (2006.01) |
| *B01D 19/00* | (2006.01) |
| *B01J 8/22* | (2006.01) |
| *C10G 49/22* | (2006.01) |

(52) U.S. Cl.
CPC .............. *C10G 49/12* (2013.01); *B01D 3/10* (2013.01); *B01D 19/00* (2013.01); *B01J 8/228* (2013.01); *C10G 49/22* (2013.01); *B01J 2208/00938* (2013.01); *C10G 2300/1074* (2013.01)

(58) Field of Classification Search
CPC .......... B01D 3/10; B01D 19/00; C10G 49/12; C10G 49/22; C10G 49/26; C10G 47/36; C10G 47/26; C10G 7/06; C10G 2300/4081; C10G 2300/107; C10G 2300/1074; B01J 8/22; B01J 10/002; B01J 8/228; B01J 8/44; B01J 8/1827; B01J 2208/00938; B01J 2208/00548
See application file for complete search history.

(56) References Cited

U.S. PATENT DOCUMENTS 5,308,476 A * 5/1994 Buttke ................ C10G 45/16
                                                208/164
6,093,373 A   7/2000 Darmancier et al.
(Continued)

FOREIGN PATENT DOCUMENTS

| WO | 2014/205172 | 12/2014 |
|---|---|---|
| WO | 2018/235113 | 12/2018 |

OTHER PUBLICATIONS

International Search Report for PCT/IT2021/050122, mailed Jun. 30, 2021, 4 pages.
(Continued)

*Primary Examiner* — Prem C Singh
*Assistant Examiner* — Brandi M Doyle
(74) *Attorney, Agent, or Firm* — NIXON & VANDERHYE

(57) ABSTRACT

The hydrogenation capacity of an upflow hydrocarbon hydrotreatment reactor is increased by expanding the gas-liquid contact surface.

11 Claims, 1 Drawing Sheet

(56) References Cited

U.S. PATENT DOCUMENTS

2005/0051915 A1\* 3/2005 Boyer .................... B01J 8/0492
                                                          422/220
2012/0315202 A1   12/2012 Song et al.

OTHER PUBLICATIONS

Written Opinion of the ISA for PCT/IT2021/050122, mailed Jun. 30, 2021, 7 pages.

\* cited by examiner

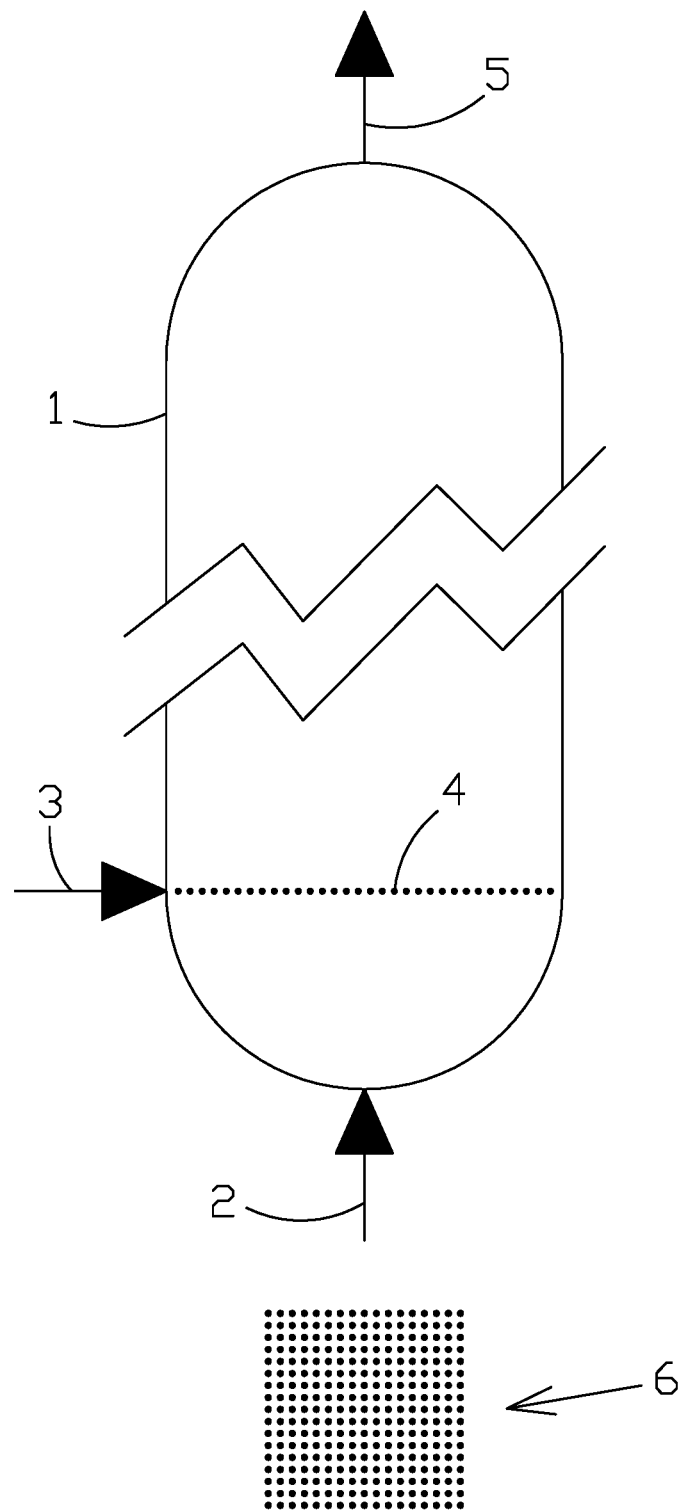

HYDROTREATMENT UPFLOW REACTORS WITH HIGH HYDROGEN-HYDROCARBON LIQUID CONTACT SURFACE AND IMPROVED HYDROGENATION CAPACITY

CROSS-REFERENCE TO RELATED APPLICATIONS

This application is the U.S. national phase of International Application No. PCT/IT2021/050122 filed Apr. 21, 2021, which designated the U.S. and claims priority to IT 102020000009880 filed May 5, 2020, the entire contents of each of which are hereby incorporated by reference.

BACKGROUND OF THE INVENTION

Field of the Invention

The present invention is applied to the field of hydroconversion of heavy hydro-carbon oils and hydrocracking of vacuum distillates (VGO).

Description of the Related Art

Crude oil undergoes distillation at atmospheric pressure to obtain a variety of products which can be destined to the market or used as feedstock for subsequent treatments. Atmospheric distillation produces a heavy residue, named atmospheric residue, which contains low hydrogen content hydrocarbons having a high boiling point, typically above 350° C., and also non-distillable hydrocarbons, as well as compounds containing sulfur, nitrogen and metals. The atmospheric residue, in turn, can be subjected to distillation at a pressure lower than atmospheric pressure, i.e. vacuum distillation, to obtain further distillates, collectively named vacuum gas oil (VGO), which can be used as feedstock for subsequent treatments, such as hydrotreatment (catalytic treatment with hydrogen).

The hydrotreatment of VGO may be carried out by employing upflow-type reactors, typically comprising a column with lower closure and upper closure cap-shaped, with the hydrogen, or hydrogen-containing gas, fed into a lower part of the reactor, into which the hydrocarbon liquid to be treated is preferably also fed, generating a gas-liquid reaction mixture which rises along the reactor and exits from the upper cap in the presence of a hydrogenation catalyst. However, downflow reactors of the trickle bed type are preferred for the hydrotreatment of vacuum distillates (VGO), in which the liquid phase, dispersed in the gaseous phase, flows from top downwards through a fixed bed of particles including the hydrogenation catalyst. Despite the discontinuity of operation implied by the use of fixed catalytic beds, downflow reactors are preferred to upflow reactors because of the higher hydrogenation rate they allow.

The residue which remains from vacuum distillation, named vacuum residue, substantially consists of non-distillable hydrocarbons having a low hydrogen content. The vacuum residue contains also the metals present in the fed crude oil, as well as sulfur and nitrogen.

To obtain finished products for the market, the vacuum residue may be subjected to hydrotreatment (catalytic treatment with hydrogen) which converts it, usually only in part, into distillable hydrocarbons. The hydrotreatment for converting a vacuum residue, or a heavy hydrocarbon oil containing such a heavy fraction, into distillates, named hydroconversion, may (and, in practice frequently is) carried out by employing a reactor of the aforesaid upflow type.

The hydrogen fed to the base is distributed by distribution means, e.g. a perforated plate or grid with orifices, generating bubbles. The bubbles rise in the reaction liquid at a speed which increases with the diameter of the bubbles themselves, while, the diameter of the bubbles being equal, such a speed is proportional to the difference of density between reaction liquid and hydrogen, or hydrogen-containing gas. In a gas-liquid mixture, the unit volume fraction occupied by the rising gas is named gas holdup. The gas holdup increases with the volumetric flow rate ($cm^3/s$) of gas fed per unit section of the reactor ($cm^2$), i.e., with the surface velocity (cm/s) of the gas. When a given surface velocity of the gas is reached, the degree of packing of the bubbles reaches a maximum value beyond which the bubbles begin to interact with one another forming bubbles of larger diameter, thus giving rise to the phenomenon known as coalescence. The maximum degree of packing, beyond which bubble coalescence occurs, for exclusively geometric reasons, is reached, as known, at a gas holdup value equal to 0.299, theoretical value related to the ideal case of bubbles having all the same diameter. This value can be slightly exceeded in practice.

In the hydroconversion of heavy oils using upflow reactors, the hydrogenation may be catalyzed employing either supported-type catalysts or slurry-type catalysts.

In the case of supported-catalyst upflow reactors, the particles (e.g., silica and/or alumina-based) on which the hydrogenation catalyst, typically including transition metals, is deposited are held suspended, above a perforated plate located in a lower portion of the reactor, by the forced circulation of reaction liquid from the bottom upwards. The hydrogen and hydrocarbon feedstock, introduced at the bottom of the reactor, and the circulation liquid are distributed on the horizontal section of the reactor by said perforated plate, also named distributor plate.

Such a reactor, named ebullated catalytic bed reactor, usually operates in a series of two or more reactors. The reaction mixture exiting the first reactor is sent to a first phase separator at the head of which the conversion products are obtained together with unreacted hydrogen, which can be purified and recycled. The liquid phase which is collected at the bottom of the first phase separator is sent to a second reactor and so on. The hydrogen, or hydrogen-containing gas, is introduced at the reactor bottom with a surface velocity limited to 5.5 cm/s, to which a gas holdup of about 0.33, of coalescence onset, corresponds (Cf. for example, U.S. Pat. No. 5,308,476).

According to a different process, of more recent commercial application, the hydroconversion of a heavy hydrocarbon oil is carried out by means of an upflow reactor with introduction at the bottom of the hydrogen, or hydrogen-containing gas, and preferably also of the hydrocarbon liquid, in this case employing a slurry catalyst, obtained by introducing into the reaction liquid an oil-soluble compound of one or more transition metals (precursor), which, by reaction with the sulfur brought in by the feedstock, or coming from another source, generates the catalytically active species. Such a reactor is named slurry bubble column reactor. The hydrogen, or hydrogen-containing gas, fed into a lower part of the reactor, is distributed by distribution means generating a bubbling-type fluid-dynamic regime which ensures homogeneity of matter and uniformity of temperature. The surface velocity of hydrogen, or hydrogen-containing gas, is limited to 2.5 cm/s, while the gas holdup, also in this case, does not exceed 0.33.

Incidentally, the limit value of 5.5 cm/s of the surface velocity of hydrogen, or hydrogen-containing gas, found in supported-type catalyst reactors, is more than double the limit of 2.5 cm/s found in slurry-type catalyst reactors. The value 5.5 cm/s is justified by the forced circulation of the reaction liquid and, to a greater extent, by the higher density of the reaction medium, due to the presence of the inorganic catalyst support. By increasing the upwards speed of bubbles relative to the reactor, these two factors allow feeding the hydrogen, or hydrogen-containing gas, at a higher surface velocity, the gas holdup being equal.

The limited surface velocity at which hydrogen is fed into slurry catalyst reactors implies that only a partial extraction is operated on the conversion products at the vapor state. When operating in a single reaction stage, the extraction is completed by distillation of the reaction liquid, after separation from the gaseous phase, by means of a distillation unit, preferably with a vacuum final stage. The reaction liquid remaining from such a vacuum distillation, containing the catalyst in slurry form, is fed back into the reaction. The metals brought in by the feedstock, present in the form of sulfides, and any solids generated by the reaction (coke) are removed by applying a contained purge of reaction liquid, possibly returning the clarified liquid to the reaction.

The unit capacity (weight flow rate of convertible heavy oil per unit of reaction volume) found in hydroconversion systems using upflow reactors, both of the supported catalyst-type and of the slurry catalyst-type, described above, is not fully satisfactory in relation to the complexity and consequent cost of the systems. An increased hydrogenation rate, being the basis of an improved hydroconversion capacity of such systems, appears to be a desirable improvement, also to facilitate the completion of the conversion, not achievable so far.

SUMMARY OF THE INVENTION

It is the object of the present invention to overcome the aforesaid drawbacks improving the hydrogenation capacity of the upflow-type reactors used in hydrocarbon hydrotreatment.

The present invention describes a method of splitting the hydrogen flow at the base of the reactor and distribution means to implement said splitting which, used in hydrocarbon hydrotreatment upflow reactors, increase the hydrogen-hydrocarbon liquid contact surface, or interface, improving the hydrogenation capability.

The improved hydrogenation capacity thus obtained is applied to:
the hydroconversion of heavy oils using slurry-type catalysts;
the hydroconversion of heavy oils using supported-type catalysts;
and
the hydrocracking of vacuum distillates (VGO) using slurry-type catalysts.

In conventional upflow reactors, e.g. those used for the hydroconversion of heavy oils, the specific surface of the hydrogen-hydrocarbon liquid interface, on which the hydrogenation rate depends, is incremented by increasing the surface velocity of hydrogen, i.e. by increasing the volumetric flow rate of hydrogen per horizontal unit section of the reactor. However, the hydrogen surface velocity can increase the specific surface of the hydrogen-hydrocarbon liquid interface until a gas holdup value of 0.33 is reached, at the threshold of coalescence, beyond which the specific surface of the hydrogen-hydrocarbon liquid interface gradually stops growing, while the hydrogenation rate starts decreasing due to the simultaneous reduction of the liquid fraction in the reactor. In hydrocarbon hydrotreatments using upflow reactors, there is no benefit to operate at gas holdup beyond 0.33. Accordingly, a gas holdup value limited to 0.33 is typically used.

According to the present invention, in a hydrotreatment using upflow reactor, in the presence of hydrogenation catalysts, the specific surface of the hydrogen-hydrocarbon liquid interface is expanded, with a corresponding increase of the hydrogenation rate, reducing the volumetric flow rate of hydrogen per single entry point. Said reduction is obtained by splitting the flow of hydrogen, or gas containing hydrogen, fed in a lower part of the reactor, into a number of entry points as to result a density of entry points at least equal to 64 per $m^2$ of horizontal section of the reactor, value that can take the gas holdup to exceed 0.33, to increase up to 0.5 and possibly over 0.5, since the density of entry points can reach the value of 2500 per $m^2$ of horizontal section of the reactor.

Said splitting of the hydrogen flow is obtained by using hydrogen distribution means, placed in a lower part of the reactor, having an orifice spacing comprised between 2 cm and 12.5 cm.

The orifice spacing being given by the square root of the ratio between the area over which the distribution means extend, expressed in $cm^2$, and the number of orifices present in the distribution means themselves.

In the catalytic hydrocarbon hydrotreatment in an upflow reactor, implemented according to the present invention, the weight flow rate of hydrogen consumed in reaction, as a consequence of the increased hydrogen-hydrocarbon liquid contact surface which is achieved, may constitute a non-negligible part of the weight flow rate of hydrogen introduced at the base of the reactor, which part is such as to lower the partial pressure of the hydrogen along the height of the reactor, particularly in very tall reactors. The lowering of the partial hydrogen pressure can be corrected by introducing at least a part of the hydrogen consumed in reaction, at one or more positions, along the height of the reactor, by distribution means.

The hydrogen distribution mode, described in the present invention, may be applied to expand the hydrogen-hydrocarbon liquid interface in the hydroconversion of heavy oils, e.g. using slurry-type catalyst upflow reactors (slurry bubble column reactors), typically operating at a hydrogen surface velocity which does not exceed 2.5 cm/s. In the hydroconversion of heavy oils with slurry-type catalysts, the hydrogen-hydrocarbon liquid interface is expanded by operating at a volumetric flow rate of hydrogen per orifice not exceeding 1.4 $m^3/h$. The resulting increase in hydrogenation rate increases the hydroconversion unit capacity and facilitates the completion of the conversion.

The higher hydrogenation rate which is achieved also allows operating the hydroconversion of a heavy oil according to a simplified process which does not require vacuum distillation of the reaction liquid for the extraction of the conversion products, given the higher volatility thereof as a result of the higher hydrogen content with which they can be obtained.

The splitting of the hydrogen flow by distribution means having orifice spacing from 2 cm to 12.5 cm, with entry point density from 64 to 2500 per $m^2$, increases the specific surface of the hydrogen-hydrocarbon liquid interface also in upflow supported-type catalyst upflow reactors (ebullated catalytic bed reactors), in which the surface velocity at which hydrogen is fed is typically limited to 5.5 cm/s. According to the present invention, said distribution means are positioned above the distributor plate, present in a lower part of such reactors, and are employed to distribute at least part of the hydrogen usually fed at the reactor bottom, below said distributor plate. The specific surface of the hydrogen-hydrocarbon liquid interface is expanded by operating at a volumetric flow rate of hydrogen per orifice not exceeding 3.1 m³/h.

The enhancement of the hydrogenation rate, which is achieved by splitting the hydrogen flow according to the present invention, allows operating hydroconversion systems using supported-type catalyst upflow reactors in a single reaction stage, recycling to the reactor the unreacted reaction liquid of the bottom of the phase separator.

An upflow reactor provided with a hydrogen distribution according to the present invention, as a result of the high hydrogen flow which may diffuse in the reaction liquid, allows operating the VGO hydrocracking, with high hydrogenation capacity, using high concentrations of slurry-type catalysts (hydrogenation capacity not achievable with conventional upflow reactors).

The VGO hydrocracking is carried out using slurry-type catalysts, obtained by introducing oil-soluble transition metal compounds into the reaction, in concentrations, expressed as transition metals present in the reaction liquid, between 3000 and 50000 parts per million, by weight. The splitting of hydrogen fed to the base of the reactor is such as to result in a entry point density of at least 400, up to 2500 per m², obtainable with distribution means having an orifice spacing from 2 cm to 5 cm, generating a gas holdup greater than 0.5, so as to operate with a lower volume fraction of liquid than that of the gas, i.e., of liquid dispersed in the gas, for a larger hydrogen-hydrocarbon liquid contact surface.

The hydrogen-hydrocarbon liquid contact surface is expanded by operating at a volumetric flow rate of hydrogen per orifice not exceeding 0.225 m³/h.

BRIEF DESCRIPTION OF THE DRAWING

The sole drawing FIGURE illustrates a method of splitting the flow of hydrogen at the base of a hydrotreatment upflow reactor, which expands the specific surface of the hydrogen-hydrocarbon liquid interface, in order to raise the hydrogenation rate.

DESCRIPTION OF THE PREFERRED EMBODIMENTS

Firstly, it will be analyzed how the specific surface of the hydrogen-hydrocarbon liquid interface may bias the hydrogenation rate in a hydrotreatment upflow reactor, which may concern, for example, heavy oils or vacuum distillates (VGO).

Taking, for example, the hydroconversion of a heavy hydrocarbon oil, consisting of a vacuum residue, typically 540° C.+ (i.e., a vacuum residue having the initial boiling point at 540° C. at atmospheric pressure), or comprising a heavy fraction 540° C.+, e.g., an atmospheric residue, said hydroconversion results in the incorporation into the conversion products (including $H_2S$ and $NH_3$) of an amount of hydrogen equal to about 4% by weight of the 540° C.+ residue, or the 540° C.+ heavy fraction converted into distillates. This percentage of hydrogen, incorporated into the conversion products, corresponds to a weight flow rate of reacted hydrogen which is only a small fraction of the weight flow rate of hydrogen fed to the base of the reactor, despite the excess catalyst with which the reactor typically operates. This happens because the reaction is fueled only by the fraction of hydrogen which, through the surface of the bubbles, may diffuse in the reaction liquid, following a definitively slow gas-liquid diffusion process due to the known low solubility of hydrogen itself in hydrocarbons, such as heavy oils or vacuum distillates (VGO).

In a hydrocarbon hydrotreatment upflow reactor, the hydrogen flow which may diffuse into the liquid is thus related to the gas-liquid contact surface (or interface) which is generated as a consequence of the hydrogen bubbling in the reaction liquid.

The gas-liquid contact surface, expressed as the ratio of the total surface area of the gas bubbles to the volume of liquid in which the gas bubbles are dispersed, is commonly named specific surface of gas-liquid interface.

In a hydrocarbon hydrotreatment upflow reactor in bubbling regime, having set the pressure at which the reactor operates and the correlated hydrogen partial pressure, the specific surface of hydrogen-hydrocarbon liquid interface is thus the factor, of physical nature, which determines the hydrogenation rate.

The expansion of the specific surface of the hydrogen-hydrocarbon liquid interface as a possible route to raise the hydrogenation rate in upflow hydrocarbon hydrotreatment reactors, does not appear to have been considered.

As it is known, in a generic bubbling gas-liquid mixture, thus also in a hydrogen-hydrocarbon liquid mixture, the specific surface of the gas-liquid interface $a_s$, for exclusively geometrical reasons, is directly proportional to the gas holdup $e_g$, in unit fraction, and inversely proportional to the diameter of the bubbles $d_s$, being $a_s = 6 \, e_g/d_s$ (cm² of contact surface, or interface, per cm³ of volume of liquid, when $d_s$ is expressed in cm).

In the hydrocarbon hydrotreatment using upflow reactors, such as heavy oil hydroconversion or VGO hydrocracking, the surface velocity of hydrogen fed determines the gas holdup $e_g$ of the hydrogen-hydrocarbon mixture and, consequently, the specific surface of the gas-liquid interface, $a_s$.

Initially, the increase of the surface velocity at which hydrogen is fed results in a proportional rise in gas holdup $e_g$, with $d_s$ remaining constant (bubbles form faster, but retain the diameter), hence a percentage increase in the specific surface of the gas-liquid interface $a_s$, equal to the percentage increase in $e_g$, is obtained. The increase of $a_s$ with the surface velocity of hydrogen, however, occurs until the maximum degree of bubble packing is reached, corresponding to a theoretical value of $e_g$ equal to 0.299, beyond which, due to the effect of the coalescence, the specific surface $a_s$ gradually stops growing, while the hydrogenation rate begins to reduce as a consequence of the simultaneous reduction of the fraction of liquid present in the reactor.

Due to coalescence, the subsequent increases in the hydrogen surface velocity produce bubbles of increasing diameter $d_s$. The increase of $d_s$: a) limits the increase in gas holdup $e_g$ (larger bubbles rise faster requiring less volume); b) contracts the specific gas-liquid surface $a_s$, this being inversely proportional to $d_s$.

In a hydrocarbon hydrotreatment carried out using conventional upflow reactors, the hydrogenation rate does increase with the surface velocity of hydrogen, but only until coalescence is reached, at which point it begins to decrease.

As seen above, in the hydroconversion of heavy oils carried out by employing conventional upflow reactors, either using supported-type catalyst or slurry-type catalyst, it is found that the maximum surface velocity employed to feed hydrogen, or hydrogen-containing gas, although different in the two cases mentioned, is nevertheless the one which always results in gas holdup values up to 0.33, on the coalescence threshold, but generally not beyond.

In conventional upflow reactors, the gas holdup value of 0.33 is found not to be exceeded. Even if, through the use of high hydrogen surface velocities, such a limit were to be exceeded, this would not lead to an increase but instead to a reduction in hydrogenation rate.

Having found that, in conventional upflow reactors, the hydrogenation rate is not further expandable, a different expansion mode of the gas-liquid contact surface was sought, pursuing the necessary increase of the gas holdup $e_g$, beyond the current limit of 0.33, in a way that did not imply a concomitant increase in the $d_s$ diameter of the bubbles, but, preferably, reduced it.

With reference to a hydrocarbon hydrotreatment upflow reactor, it has been found that the gas holdup value increases, and can exceed the value of 0.33 and rise to 0.5 and more, by progressively reducing the volumetric flow rate of hydrogen per single entry point by splitting a given flow of hydrogen, fed at reactor bottom, into an increasing number of entry points per $m^2$ of horizontal section of the reactor, indicated hereafter with $D_i$ (introduction density, or entry point density).

Incidentally, the volumetric flow rate of hydrogen per orifice can be calculated as follows. The surface velocity uG of hydrogen fed at the base of the reactor, usually expressed, as above, in cm/s, can be equivalently expressed in m/h. The surface velocity uG, expressed in m/h, is the ratio between the flow rate at which the hydrogen is fed, expressed in $m^3/h$, and the reactor section area, expressed in $m^2$. The value of uG then gives the hourly flow rate of hydrogen which is splitted into $D_i$ entry points. Therefore, the ratio uG/$D_i$ between the hydrogen surface velocity uG, expressed in m/h, and the entry point density $D_i$, expressed in $m^{-2}$, gives the hourly flow rate of hydrogen per orifice, expressed in $m^3/h$.

Since the lowering of the volumetric flow rate of hydrogen per single entry point produces the progressive reduction of the average diameter of the bubbles, the rise of the gas holdup which is observed is the natural consequence of the lower upwards speed of smaller bubbles and indirectly measures their reduction in diameter.

Given a certain hydrogen flow, the dual effect which produces the reduction of the volumetric flow rate of hydrogen per entry point (orifice), i.e. the increase of the gas holdup $e_g$ and, at the same time, the reduction of the diameter $d_s$ of the bubbles, quickly raises the specific surface of gas-liquid interface $a_s$ and, therewith, raises the hydrogenation rate, which can thus be much higher than that of conventional upflow reactors, limited instead by the gas coalescence.

In order to reduce the volumetric flow rate of hydrogen per entry point, the flow of hydrogen, or hydrogen-containing gas, is splitted by distribution means, of given orifice spacing, located in a lower part of the upflow reactor, preferably extending over the entire horizontal section of the reactor. Distribution means which partially extend over the horizontal section of the reactor are also usable. The orifice spacing, expressed in cm, is defined as the square root of the ratio of the extension area of the distribution means, expressed in $cm^2$, to the number of orifices. Therefore, the orifice spacing $o_s$ expressed as $o_s=(10000/D_i)^{1/2}$, gives the orifice spacing that the distribution means must have to be able to split the flow of hydrogen, or hydrogen-containing gas, with a density $D_i$ of entry points per $m^2$ of surface area over which said distribution means extend. By extending the distribution means over the entire horizontal section of the reactor, such entry point density coincides with the entry point density related to $m^2$ of horizontal section of the reactor. In order to reduce the volumetric flow rate of hydrogen per entry point, so that the gas holdup can exceed the value of 0.33, the hydrogen flow, or the gas flow containing hydrogen, is splitted alone into such a number of entry point as to result in an entry point density of at least 64 per $m^2$ of horizontal section, it being possible to increase such a density to 2500 in order to maximize the specific gas-liquid contact surface. In order to split the hydrogen flow with an entry point density ($D_i$) per $m^2$ of horizontal section equal to 64, the distribution means must be provided with an orifice spacing of 12.5 cm, as indicated above. While an introduction density per $m^2$ of horizontal section of 400 requires distribution means with orifice spacing of 5 cm. Eventually, an introduction density per $m^2$ of horizontal reactor section area of 2500 is implemented using distribution means having an orifice spacing of 2 cm.

The only gas splitting may take place by the holes of a plate under which the gas and, possibly, the hydrocarbon liquid is introduced, or by the orifices of a grid, having one or more planes, made up of concentric circular or parallel hydrogen-filled tubes, possibly reticulated, immersed in the liquid.

For example, distribution means with an orifice spacing equal to 2 cm may comprise a set of parallel tubes, internally supplied with gas, with an external diameter of 1 cm, with an interaxial spacing of 2 cm, perforated at the top and/or bottom, with an orifice spacing of 2 cm.

FIG. 1 shows a hydrocarbon hydrotreatment upflow reactor 1 in bubbling regime which can be used, for example, for the hydroconversion of heavy oils or VGO hydrocracking, in which through the splitting of the hydrogen fed in a lower part of the reactor, the volumetric flow rate of hydrogen per entry point is reduced so as to be able to raise the gas holdup above 0.33 and consequently expand the specific surface of the hydrogen-liquid hydrocarbons interface.

The hydrocarbon liquid is preferably introduced at the bottom of the reactor 1, through a line 2, to be treated in the presence of a hydrogenation catalyst, while hydrogen, or hydrogen-containing gas, is fed through a line 3. Such a flow is splitted at the base of the reactor with a density $D_i$ of entry points per $m^2$ of horizontal section of the reactor which is variable from a minimum value of 64 up to 2500, which progressively reduces the volumetric flow rate per single entry point by means of distribution means 4 immersed in the reaction liquid, having an orifice spacing from 2 cm to 12.5 cm, generating within the reactor a hydrogen-hydrocarbon liquid reaction mixture which exits the head of the reactor 1 through a line 5. Said mixture having a gas holdup value increasing with decreasing orifice spacing, the gas holdup being able to exceed 0.33 and rising up to 0.5 and beyond.

In FIG. 1, in the part below the reactor 1, assuming a reactor diameter of 4 meters, the entry point density is shown, indicated by reference numeral 6, of a possible configuration of the hydrogen entry points in the horizontal section of the reactor in the case of 64 introductions per $m^2$ (each introduction is indicated with a point), this being the minimum density of entry points into which hydrogen is splitted according to the present invention. Such an entry point density is obtained by means of the distributor 4, immersed in the reaction liquid, represented in FIG. 1 with an orifice spacing of 12.5 cm (each orifice is indicated with a dot) this being the upper limit of the spacing to operate according to the present invention.

In a hydrocarbon hydrotreatment with an upflow reactor, whether a heavy oil hydroconversion or a vacuum distillate hydrocracking (VGO), the weight flow rate of hydrogen consumed in the reaction, when the specific surface of the hydrogen-hydrocarbon liquid interface is significantly increased, may constitute a non-negligible part of the weight flow rate of hydrogen introduced at the base of the reactor, in particular in very tall reactors, such that the partial pressure of hydrogen itself is lowered along the height of the reactor. The lowering of the partial pressure of hydrogen can be prevented, or at least limited, by introducing, partially or totally, the hydrogen consumed in reaction, by one or more distribution means positioned along the height of the reactor.

The way in which the hydrogen flow is splitted in order to increase the specific surface of the hydrogen-hydrocarbon liquid interface, described above, may advantageously be applied to:

- the hydroconversion of heavy hydrocarbon oils using slurry-type catalysts;
- the hydroconversion of heavy hydrocarbon oils using supported-type catalysts;
- the hydrocracking of vacuum distillates (VGO) using slurry-type catalysts.

The hydroconversion of a heavy oil by means of an upflow reactor using slurry-type catalysts (slurry bubble column reactor) is carried out by feeding at the reactor bottom the feedstock to be converted and the hydrogen, or the hydrogen-containing gas, the latter with a surface velocity not exceeding 2.5 cm/s. The catalyst is introduced in the form of a compound, preferably, oil-soluble, of one or more transition metals, named precursor.

The gas-liquid mixture which is generated in the reaction conditions exits at the reactor head and is sent to a phase separator at the head of which volatile conversion products are obtained together with hydrogen which can be sent to a purification treatment for reuse in the reaction.

At the bottom of the separator, the reaction liquid is obtained which, after depressurization, is sent to a distillation unit with a final vacuum stage to complete the extraction of the high-boiling conversion products. The vacuum distillation residue, containing the catalyst, is fed to the reactor.

The metals brought in by the feedstock, present in the form of sulfides, and any solids generated by the reaction, are removed by applying a contained purge of reaction liquid, preferably returning the clarified liquid to the reaction, after separation of the solids.

In order to expand the specific surface of the hydrogen gas-reaction liquid interface, the flow of hydrogen, or hydrogen-containing gas, is splitted into a number of entry points such that a density $D_i$ of entry points per m$^2$ of horizontal section of the reactor from 64 to 2500 is obtained. This splitted flow generates, within the reactor, a gas-liquid mixture having a gas holdup value greater than 0.33. Such a density of entry points is obtained by using hydrogen distribution means having an orifice spacing comprised between 2 cm and 12.5 cm, placed in a lower part of the reactor. In the hydroconversion of heavy oils with slurry-type catalysts, the hydrogen-hydrocarbon liquid contact surface is expanded by operating at a volumetric flow rate of hydrogen per orifice not exceeding 1.4 m$^3$/h.

The hydrogen consumed in reaction may be integrated with one or more feeds along the height of the reactor to prevent or limit the reduction of the partial pressure.

The expansion of the specific surface of the hydrogen-hydrocarbon liquid interface, thus obtained, takes the hydrogenation rate largely beyond that of a conventional heavy oil hydroconversion upflow reactor using slurry-type catalysts (slurry bubble column reactor) which typically operate at gas holdup up to 0.33, but not beyond.

The higher hydrogenation rate, achievable by reducing the hydrogen flow rate per orifice, allows operating the hydroconversion of a heavy oil, using slurry-type catalyst upflow reactor, according to a simplified process which does not require vacuum distillation for the extraction of conversion products, since their volatility is raised by the higher hydrogen content with which they can be obtained. The reaction liquid, collected at the bottom of the separator, after separation of the gaseous phase, is sent to a distillation unit, operating at atmospheric pressure, generating a residue which can be fed to the reactor, without the need for a subsequent vacuum distillation, as required instead operating according to the background art. The metal sulfides brought in by the feedstock and any solids generated by the reaction, again in this case, can be removed from the system by a limited purge of reaction liquid, preferably with return of the liquid to the reaction after mechanical separation of the solids.

The method and system of splitting the flow of hydrogen, or hydrogen-containing gas, in a hydrocarbon hydrotreatment upflow reactor, described in the present invention to expand the specific surface of the hydrogen-hydrocarbon liquid interface, can also be advantageously applied to the hydroconversion systems using supported-type catalysts (ebullated catalytic bed reactors), in which, as mentioned above, the hydrogen, or hydrogen-containing gas, is fed with a surface velocity limited to 5.5 cm/s.

In such an application, the hydrogen, or hydrogen-containing gas, distribution means must have orifice spacing from 2 cm to 12.5 cm, which results in a hydrogen entry point density of 64 to 2500 per m$^2$ of horizontal section of the reactor. These distribution means are always positioned in a lower part of the reactor but at a height greater than that of the distributor plate and are fed with at least part of the hydrogen which is usually supplied at the bottom of the reactor, below said distributor plate. The hydrogen-hydrocarbon liquid interface, is expanded by operating at a volumetric flow rate of hydrogen per orifice not exceeding 3.1 m$^3$/h.

The expansion of the reactor hydrogenation capacity, resulting from an increased specific surface of the hydrogen-hydrocarbon liquid interface, allows to increase the flow rate of convertible feedstock per m$^3$ of reaction volume and to increase the degree of conversion, typically limited to 75%.

With reference to heavy oil hydroconversion using supported-type catalyst upflow reactors, with hydrogen distribution at the base of the reactor carried out (either also or exclusively) in the manner and with the distribution means described in the present invention, the specific surface of the hydrogen-hydrocarbon liquid interface may be expanded, with proportional increase in the hydrogenation rate, so as to be able to operate the hydroconversion in single stage. In this case, the partially converted reaction liquid collected at the bottom of the phase separator, usually sent to the next reaction stage, is instead sent back to the same reactor that generated it. The conversion products extracted at the phase separator head will thus match the fed feedstock, bringing the hydroconversion to completion.

The fines deriving from the catalyst and of the sulfides of the metals introduced with the feedstock can be removed by mechanical separation means on a limited flow of reaction liquid that, cleared of the solids, can return to the reaction.

The hydrogen flow distribution mode of the present invention, capable of expanding in an upflow hydrotreatment reactor the specific surface of the hydrogen-hydrocarbon liquid interface, can also be advantageously applied to the hydrocracking of vacuum distillates (VGO). For such treatment, up to now, downflow reactors, of the trickle bed type, with the trickling liquid dispersed in the gas, because they are characterized by a high gas-liquid contact surface, have been preferred to upflow reactors. Such downflow reactors, however, involve the use of fixed catalytic beds, when the catalytically active transition metals with which the catalytic bed is impregnated could be more effectively and more easily employed in dispersed form (slurry catalyst) using an upflow reactor.

However, slurry-type, transition metal-based hydrogenation catalysts used with conventional upflow reactors, have so far shown limited hydrogenation capacity that has prevented their use in VGO hydrocracking. Indeed, a hydrogenation capacity ceiling is reached already at low concentrations, beyond which increasing the concentration of catalyst has no effect on the rate of hydrogenation whatsoever. See, e.g., as described in U.S. Pat. No. 4,226,742.

It has now been found that the hydrogenation rate in the presence of a slurry-type catalyst, based on transition metals, can instead increase in proportion to the catalyst concentration if correspondingly the flow of hydrogen that can diffuse from the gas phase into the hydrocarbon liquid, to fuel the reaction, is increased.

A hydrocarbon hydrotreatment upflow reactor, with slurry-type catalyst, which operates the hydrogen flow splitting according to the present invention, as it allows the expansion of the hydrogen gas flow which diffuses into the reaction liquid, also allows obtaining a hydrogenation rate proportional to the catalyst concentration used, even if high. Such a type of reactor can thus be used in the hydrocracking of VGO.

The hydrocracking treatment of VGO can be performed by the following typical process steps. It is firstly necessary to feed the feedstock consisting of vacuum distillates (VGO) to the reactor and introduce a catalyst precursor consisting of oil-soluble transition metal compounds, while the hydrogen, or gas including hydrogen, is fed into a lower part of the reactor at a surface velocity not exceeding 2.5 cm/s. The resulting mixture, including gas and reaction liquid, exits at the reactor head and is sent to a phase separator at the head of which a gaseous phase is obtained containing the lighter reaction products and unreacted hydrogen which can be purified and recycled back to the reactor. The reaction liquid, separated at the bottom of the separator, after depressurization, is sent to a distillation unit to extract further reaction products. The distillation residue, containing the catalyst, is returned to the reactor. Any metals brought in by the VGO, which are present in the form of sulfides in the reaction liquid and which may themselves have hydrogenating catalytic activity, are removed in order to prevent the accumulation by applying a contained purge of reaction liquid, preferably by mechanically separating them from such a purge and returning the clarified liquid to the reaction.

In order to operate the VGO hydrocracking by means of an upflow reactor at the required hydrogenation rates, concentrations of slurry-type catalyst between 3000 and 50000 ppm (parts per million by weight of transition metal, or transition metals, calculated relative to the reaction liquid) are used and for the catalytic activity to manifest even at the highest catalyst concentrations, the flow of hydrogen, or a hydrogen-containing gas, is splitted in a lower part of the reactor in a number of entry points such as to result in a entry point density $D_i$ of at least 400 up to 2500 per m², using distribution means with orifice spacing of from 2 cm to 5 cm, generating a gas-liquid mixture with gas holdup greater than 0.5 thus maximizing the gas-liquid contact surface and with it the hydrogen flow which can diffuse in the reaction liquid to fuel the hydrogenation to the extent that the catalyst, for the concentration in which it is used, can activate. The hydrogen-hydrocarbon liquid contact surface is expanded by operating at a volumetric flow rate of hydrogen per orifice not exceeding 0.225 m³/h.

The hydrogen consumed in the reaction can be partially or totally integrated through one or more distribution means positioned along the height of the reactor.

Based on the provided description of a preferred embodiment example, it is apparent that changes may be introduced by a person skilled in the art without because of this departing from the scope of protection of the invention as defined by the following claims.

The invention claimed is:

1. A hydrocarbon hydrotreatment process utilizing an upflow type reactor in bubbling regime, said process comprising:
   a step of reacting a hydrocarbon liquid with hydrogen or with a hydrogen-containing gas in said upflow reactor, wherein said upflow reactor comprises:
      a column delimited by a cap both at the bottom and at the top;
      a system for feeding the hydrocarbon liquid;
      a system for feeding the hydrogen or hydrogen-containing gas;
      means for distributing either said hydrogen or said hydrogen-containing gas, said distribution means comprising a plurality of orifices,
   wherein said step of reacting comprises:
   feeding said distribution means exclusively with said hydrogen or with said hydrogen-containing gas,
   wherein said distribution means is placed at a lower part of said reactor and is immersed in said hydrocarbon liquid,
   introducing either the hydrogen or the hydrogen-containing gas into the plurality of orifices of said distribution means to thereby introduce either the hydrogen or the hydrogen-containing gas into said reactor and form, in the presence of a hydrogenation catalyst, a gas-reaction liquid mixture which rises along said reactor and exits at the upper cap,
   wherein, in said process, the flow of hydrogen, or of the hydrogen-containing gas, fed in said reactor, is splitted by means of said distribution means, into such a number of entry points as to result in an entry point density per m² of horizontal section of said reactor between 64 and 2500, a number of said orifices coinciding with said number of entry points,
   said hydrogen, or said hydrogen-containing gas, being fed to said reactor at a surface velocity:
      not exceeding 2.5 cm/s if said process uses a slurry-type catalyst obtained by introducing oil-soluble transition metal compounds into the reaction, and
      not exceeding 5.5 cm/s if said process uses a supported type catalyst.

2. The process according to claim 1, wherein at least a part of the hydrogen consumed during the hydrotreatment of hydrocarbons is fed to said reactor, at said column, introducing hydrogen or hydrogen-containing gas by means of one or more further distribution means placed along the height of said reactor.

3. A heavy oil hydrotreating process comprising the hydrocarbon hydrotreatment process of claim 2, carried out by using a slurry-type catalyst as a hydrogenation catalyst, obtained by introducing oil-soluble compounds of transition metals into the reaction, the gas-liquid mixture at the outlet of the head of said reactor being sent to a phase separator at the head of which a gaseous phase containing conversion products is obtained, comprising volatile hydrocarbons and unreacted hydrogen, and at the base of which a reaction liquid is obtained, which, upon depressurization, is sent to a distillation unit for the extraction of further conversion products, the residual liquid from distillation, including the slurry catalyst, being fed to said reactor after purging for removing the solids generated by the reaction, wherein hydrogen, or hydrogen-containing gas, fed to said reactor, is introduced, at said lower end, at a volumetric flow rate per orifice of said distribution means of not more than 1.4 $m^3/h$.

4. A heavy oil hydrotreating process according to claim 3, wherein said distillation unit includes a final vacuum stage.

5. A process of hydrotreating vacuum distillates comprising the hydrocarbon hydrotreatment process of claim 2, carried out by using a slurry-type catalyst as a hydrogenation catalyst, obtained by introducing oil-soluble compounds of transition metals into the reaction, the gas-liquid mixture at the outlet of the head of said reactor being sent to a phase separator at the head of which a gaseous phase containing volatile conversion products and unreacted hydrogen is obtained, and at the base of which a reaction liquid is obtained, which, upon depressurization, is sent to a distillation unit for the extraction of further hydrocarbon products, the residual liquid from distillation, including the catalyst, being fed to said reactor, wherein:

the flow of hydrogen, or hydrogen-containing gas, inside said reactor, at said lower part, is splitted into such a number of entry points as to result in an entry point density between 400 and 500 per $m^2$ of horizontal section of said reactor;

the hydrogen, or the hydrogen-containing gas, fed to said reactor, is introduced, at said lower part, with a volumetric flow rate per orifice of said distribution means not higher than 0.225 $m^3/h$ using concentrations of said catalyst between 3000 and 50000 ppm, "ppm" meaning parts per million by weight of transition metal, or transition metals, calculated with respect to the reaction liquid.

6. The process of claim 5, further comprising, prior to the step of feeding the residual liquid from distillation to said reactor, purging for removing the metal sulfides brought in by the hydrocarbon liquid.

7. A heavy oil hydrotreating process comprising the hydrocarbon hydrotreatment process of claim 1, carried out by using a slurry-type catalyst as a hydrogenation catalyst, obtained by introducing oil-soluble compounds of transition metals into the reaction, the gas-liquid mixture at the outlet of the head of said reactor being sent to a phase separator at the head of which a gaseous phase containing conversion products is obtained, comprising volatile hydrocarbons and unreacted hydrogen, and at the base of which a reaction liquid is obtained, which, upon depressurization, is sent to a distillation unit for the extraction of further conversion products, the residual liquid from distillation, including the slurry catalyst, being fed to said reactor after purging for removing the solids generated by the reaction, wherein hydrogen, or hydrogen-containing gas, fed to said reactor, is introduced, at said lower end, at a volumetric flow rate per orifice of said distribution means of not more than 1.4 $m^3/h$.

8. A heavy oil hydrotreating process according to claim 7, wherein said distillation unit includes a final vacuum stage.

9. A heavy oil hydrotreating process comprising the hydrocarbon hydrotreatment process of claim 1, carried out by using a supported-type catalyst as a hydrogenation catalyst, including transition metals and deposited on particles kept suspended, above a distributor plate placed in said lower part of the reactor, by the forced circulation of the reaction liquid, the hydrogen and the hydrocarbon liquid, introduced at the bottom of said reactor, and the circulation liquid being distributed on the horizontal section of said reactor by said distributor plate, the gas-reaction liquid mixture at the outlet of the head of said reactor being sent to a phase separator at the head of which a gaseous phase containing conversion products and unreacted hydrogen is obtained, and at the base of which the unconverted hydrocarbon residue is obtained, wherein said distribution means are positioned above said perforated plate to supply at least a portion of the hydrogen fed to said reactor for a volumetric flow rate of hydrogen, or hydrogen-containing gas, per orifice of said distribution means of not more than 3.1 $m^3/h$.

10. A process of hydrotreating vacuum distillates comprising the hydrocarbon hydrotreatment process of claim 1, carried out by using a slurry-type catalyst as a hydrogenation catalyst, obtained by introducing oil-soluble compounds of transition metals into the reaction, the gas-liquid mixture at the outlet of the head of said reactor being sent to a phase separator at the head of which a gaseous phase containing volatile conversion products and unreacted hydrogen is obtained, and at the base of which a reaction liquid is obtained, which, upon depressurization, is sent to a distillation unit for the extraction of further hydrocarbon products, the residual liquid from distillation, including the catalyst, being fed to said reactor, wherein:

the flow of hydrogen, or hydrogen-containing gas, inside said reactor, at said lower part, is splitted into such a number of entry points as to result in an entry point density between 400 and 500 per $m^2$ of horizontal section of said reactor;

the hydrogen, or the hydrogen-containing gas, fed to said reactor, is introduced, at said lower part, with a volumetric flow rate per orifice of said distribution means not higher than 0.225 $m^3/h$ using concentrations of said catalyst between 3000 and 50000 ppm, "ppm" meaning parts per million by weight of transition metal, or transition metals, calculated with respect to the reaction liquid.

11. The process of claim 10, further comprising, prior to the step of feeding the residual liquid from distillation to said reactor, purging for removing the metal sulfides brought in by the hydrocarbon liquid.

* * * * *